United States Patent [19]

Klei

[11] Patent Number: 5,019,614
[45] Date of Patent: May 28, 1991

[54] STABILIZED POLYMERS

[75] Inventor: Ebel Klei, Amsterdam, Netherlands

[73] Assignee: Shell Oil Company, Houston, Tex.

[21] Appl. No.: 167,801

[22] Filed: Mar. 14, 1988

[30] Foreign Application Priority Data

Apr. 22, 1987 [GB] United Kingdom ............... 8709488

[51] Int. Cl.$^5$ .......................................... C08K 5/3492
[52] U.S. Cl. ..................... 524/100; 524/91; 524/258; 524/336
[58] Field of Search ................. 524/91, 100, 336, 258

[56] References Cited

U.S. PATENT DOCUMENTS

| | | | |
|---|---|---|---|
| 2,495,286 | 1/1950 | Brubaker | 260/63 |
| 3,452,056 | 6/1969 | Sundholm | 524/258 |
| 3,694,412 | 9/1972 | Nozaki | 260/63 |
| 3,753,952 | 8/1973 | Guillet | 523/125 |
| 3,786,021 | 1/1974 | Mathis et al. | 524/336 |
| 3,817,914 | 6/1974 | Dexter et al. | 524/100 |
| 3,929,727 | 12/1975 | Russell et al. | 260/45.95 F |
| 4,024,104 | 5/1977 | Russell et al. | 260/45.8 R |
| 4,089,839 | 5/1978 | Jancis | 524/91 |

FOREIGN PATENT DOCUMENTS

| | | |
|---|---|---|
| 121965 | 8/1984 | European Pat. Off. . |
| 181014 | 5/1986 | European Pat. Off. . |
| 57-159828 | 7/1974 | Japan . |
| 54-158484 | 5/1978 | Japan . |
| 1081304 | 9/1967 | United Kingdom . |

Primary Examiner—Veronica P. Hoke

[57] ABSTRACT

Compositions comprising polymers of carbon monoxide and at least one ethylenically unsaturated hydrocarbon are stabilized against degradation caused by exposure to ultra violet light by intimately mixing therewith a stabilizing quantity of certain organic stabilizers. These certain stabilizers are hydroxybenzophenones, hydrobenzotriazoles, diphenylamines and aniline substituted triazines.

4 Claims, No Drawings

STABILIZED POLYMERS

FIELD OF THE INVENTION

The invention relates to compositions comprising a linear alternating polymer of carbon monoxide and at least one ethylenically unsaturated hydrocarbon. More particularly, the invention relates to compositions of such polymers which are stabilized against the detrimental effect of ultra violet light by the incorporation therein of certain organic stabilizers.

BACKGROUND OF THE INVENTION

The class of polymers of carbon monoxide and olefin(s) has been known for a number of years. Brubaker, U.S. Pat. No. 2,495,286 produced such polymers of relatively low carbon monoxide content in the presence of free radical catalysts, e.g., peroxy compounds. G.B. No. 1,081,304 produces similar polymers of higher carbon monoxide content in the presence of alkylphosphine complexes of palladium salts as catalyst. Nozaki extended the process to produce linear alternating polymers through the use of arylphosphine complexes of palladium salts and certain inert solvents, e.g., U.S. Pat. No. 3,694,412.

More recently the class of linear alternating polymers of carbon monoxide and at least one ethylenically unsaturated hydrocarbon has become of greater interest in part because of the greater availability of the polymers. The more recent general process for the production of such polymers is illustrated by published European patent applications Nos. 0,121,965 and 0,181,014. The process generally involves the use of a catalyst composition formed from a compound of the Group VIII metals selected from palladium, cobalt and nickel, the anion of a non-hydrohalogenic acid having a pKa less than about 2 and a bidentate ligand of phosphorous, arsenic or antimony.

The resulting polymers are relatively high molecular weight materials having utility as premium thermoplastics in the production of shaped articles such as containers for food and drink and parts and housings for the automotive industry. Although the polymers are relatively stable, the linear alternating polymers do undergo to some degree the degradation by exposure to elevated temperature and to ultra violet light characteristic of most if not all organic polymers. Russell et al, U.S. Pat. No. 3,929,729 and U.S. Pat. No. 4,024,104 teach the use of certain benzophenones and of certain benzotriazoles as thermal stabilizers of certain polymers of carbon monoxide and ethylene with the optional presence of third monomers.

Although the disclosures of such polymers by Russell et al is rather broad, the polymers tested are rather limited. The disclosures do not appear to be directed toward linear alternating polymers of carbon monoxide and olefin(s). In any event, the Russell et al disclosures deal with protection of the polymer against thermal degradation. It would be of advantage to provide for stabilization against degradation by ultra violet light.

SUMMARY OF THE INVENTION

This invention relates to polymer compositions stabilized against degradation resulting from exposure to ultra violet light and a method for producing such stabilized compositions. More particularly, the invention relates to compositions comprising a linear alternating polymer of carbon monoxide and at least one ethylenically unsaturated hydrocarbon, which compositions are stabilized against degradation resulting from exposure to ultra violet light by the inclusion therein of certain organic compounds as stabilizers.

DESCRIPTION OF THE INVENTION

The polymers which are stabilized according to the invention are the linear alternating polymers of carbon monoxide and at least one ethylenically unsaturated hydrocarbon which are often referred to as polyketones or polyketone polymers. The ethylenically unsaturated hydrocarbons which are useful as precursors of the polyketone polymers have up to 20 carbon atoms inclusive, preferably up to 10 carbon atoms inclusive, and are aliphatic such as ethylene and other α-olefins including propylene, 1-butene, 1-octene and 1-dodecene or are arylaliphatic containing an aryl substituent on an otherwise aliphatic molecule, particularly an aryl substituent on a carbon atom of the ethylenic unsaturation. Examples of the latter class of ethylenically unsaturated hydrocarbons are p-methylstyrene, p-ethylstyrene and m-i-propylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers of carbon monoxide, ethylene and a second ethylenically unsaturated hydrocarbon are employed, there will be at least 2 units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain of the preferred polymers is therefore illustrated by the formula:

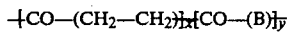

Where B is the moiety of the second hydrocarbon polymerized through the ethylenic unsaturation. The $-CO-(CH_2-CH_2)-$ units and the $-CO-(B)-$ units are formed randomly throughout the polymer chain and the ratio of y:x is no more than about 0.5. In the modification of the invention which employs copolymers of carbon monoxide and ethylene without the presence of a second hydrocarbon, the polymers are represented by the above formula wherein $y=0$. When y is other than 0, i.e., terpolymers are employed, ratios of y:x from about 0.01 to about 0.1 are preferred. The end groups or "caps" of the polymer chain will depend on what materials are present during the production of the polymer and whether and how the polymer is purified. The precise nature of the end groups is of little significance, however, so far as the overall properties of the polymer are concerned so that the polymers are fairly represented by the polymer chain as depicted above.

Of particular interest are the polymers of the above formula having a molecular weight of from about 1,000 to about 200,000, particularly those of molecular weight of from about 10,000 to about 50,000, containing substantially equimolar quantities of carbon monoxide and hydrocarbon. The physical properties of such polymers will depend in part on the molecular weight, whether the polymer is a copolymer or a terpolymer and the relative proportion of the second hydrocarbon present in the case of a terpolymer. Typical melting points of such polymers are from about 175° C. to about 280° C., particularly from about 210° C. to about 270° C.

The polymers are produced by general methods illustrated by the published European patent applications Nos. 0,121,965 and 0,181,014. Although the scope of the polymerization process is extensive, a preferred catalyst composition for such polymerization is formed from palladium acetate, the anion of trifluoracetic acid or p-toluenesulfonic acid and a bidentate ligand selected from 1,3-bis(diphenylphosphino)propane and 1,3-bis[di(2-methoxyphenyl)phosphino]propane.

The polyketone polymers of the invention are stabilized against degradation caused by exposure to ultra violet light by incorporation therein of a stabilizing amount of a stabilizer of defined structure selected from certain hydroxybenzophenones, certain hydroxy-benzotriazoles, certain diphenylamines and certain aniline-substituted triazines. Although a number of ultra violet light stabilizers work well in other polymeric materials, most do not effectively stabilize the polyketone polymers as well as the above listed materials.

The hydroxybenzophenones employed as stabilizers in the compositions of the invention are compounds of the formula:

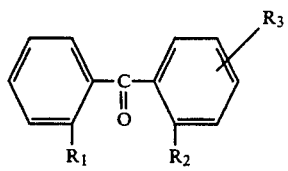

wherein $R_1$ and $R_2$ independently are hydrogen or hydroxyl with the provisio that at least one of $R_1$ or $R_2$ is hydroxyl, and $R_3$ is hydroxyl, alkyl of up to 12 carbon atoms inclusive or alkoxy of up to 12 carbon atoms inclusive.

Illustrative compounds of this formula are 2',4-dihydroxybenzophenone, 2-hydroxybenzophenone, 2',4,6-trihydroxybenzophenone, 2-hydroxy-4-methylbenzophenone, 2-hydroxy-4-methoxy-benzophenone, 2,2'-dihydroxy-4-n-hexyloxybenzophenone, 2hydroxy-4-n-octyloxybenzophenone and 2,2'-dihydroxy-4-n-undecyloxybenzophenone. Preferred hydroxybenzophenone stabilizers are those in which $R_2$ is hydroxy and particularly preferred are those hydroxybenzophenones wherein $R_3$ is alkoxy of 6 to 10 carbon atoms inclusive. The most preferred hydroxybenzophenone stabilizer is 2-hydroxy-4-n-octyloxybenzophenone.

The hydroxybenzotriazoles useful as stabilizers in the composition of the invention are compounds of the formula

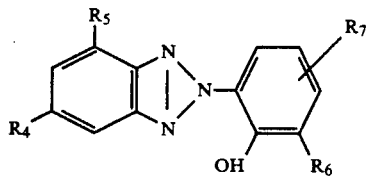

Wherein $R_4$ and $R_5$ independently are hydrogen or halogen, particularly the middle halogens chloro or bromo, $R_6$ is alkyl of up to 16 carbon atoms inclusive, and $R_7$ is hydrogen, hydroxyl, alkyl of up to 8 carbon atoms inclusive, aryl of up to 17 carbons inclusive, aralkyl of from 7 to 17 carbon atoms inclusive and alkaryl of from about 7 to 17 carbon atoms inclusive.

Illustrative hydroxybenzotriazoles of the above formula are 2-(2'-hydroxy-4'-n-hexylphenyl)benzotriazole, 2-(2'hydroxy-4'-n-hexylphenyl)benzotriazole, 2-(2'-hydroxy-3',5'-di-t-butylphenyl)benzotriazole, 2-(2'-hydroxy-3'-t-butyl-4'-methyl)benzotriazole, 2-(2'-hydroxy-3'-t-butyl-4'-octyloxyphenyl)benzotriazole, 2-(2'-hydroxy-3-i-propyl-5'-n-butylphenyl)-5,7-dichlorobenzotriazole, 2-(2'-hydroxy-3',5'-di-t-butylphenyl)-7-chlorobenzotriazole, 2-(2'-hydroxy-3'-t-butylphenyl)-5-chlorobenzotriazole, 2-(2'-hydroxy-3'-ethylphenyl)-5-chlorobenzotriazole, and 2-(2'-hydroxy-3'-i-amyl-5'-benzylphenyl)-5,7-dibromobenzotriazole. Preferred benzothiazoles are those wherein $R_4$ is chlorine, particularly those chlorobenzotriazoles wherein $R_6$ is a secondary or tertiary alkyl group, especially t-butyl. The most preferred benzotriazole is 2-(2'-hydroxy-3'-t-butyl-5'-methylphenyl)-5-chlorobenzotriazole.

The diphenylamines employed as stabilizers are represented by the formula

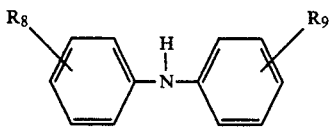

wherein $R_8$ and $R_9$ independently are hydrogen, alkyl of up to 12 carbon atoms inclusive, phenyl or benzyl with up to two alkyl substituents of up to 8 carbon atoms inclusive on the methylene carbon atom.

Illustrative diphenyl amines are diphenylamine, di-(4-methylphenyl)amine, di(4-benzylphenyl)amine, 4,4'-bis-($\alpha,\alpha$-n-propylbenzyl)phenyl amine, di(4-$\alpha$-ethylbenzylphenyl)amine, di(4-phenylphenyl)amine, 4-propylphenyl 4-phenylphenyl amine, and di(4-nonylphenyl)amine. Preferred diphenylamines are those in which at least one of $R_8$ and $R_9$ is $\alpha,\alpha$-dialkylbenzyl or n-alkyl of 6 to 10 carbon atoms. Particularly preferred as the diphenylamine stabilizer is 4,4'-bis($\alpha,\alpha$-dimethyl benzyl)-diphenylamine.

The aniline-substituted triazine stabilizers of the invention are compounds of the formula

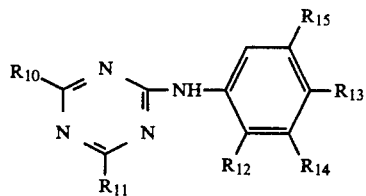

wherein $R_{10}$ and $R_{11}$ are independently alkyl or thioalkyl of up to 14 carbon atoms inclusive, $R_{12}$ and $R_{13}$ independently are hydrogen or kydroxyl with the provisio that at least one of $R_{12}$ and $R_{13}$ is hydroxyl, $R_{14}$ and $R_{15}$ independently are hydrogen or alkyl of up to 6 carbon atoms inclusive with the proviso that at least $R_{14}$ is alkyl if $R_{12}$ is hydroxyl and at least one of $R_{14}$ and $R_{15}$ is alkyl if $R_{13}$ is hydroxyl.

Illustrative aniline-substituted triazines of the above formula are 6-(2'-hydroxy-3'-propylanilino)-2,4-dimethyl-1,3,5-triazine, 6-(4'-hydroxy-5'-t-butylanilino)-2,4-di(hexylthio)-1,3,5-triazine, 6-(2',4'-dihydroxy-3',5'-di-t-butylanilino)-2-hexyl-4-ethylthio-1,3,5-triazine, 6-(2'- hydroxy-3'-t-butyl-5-methylanilino)-2,4-dicyclohexyl-1,3,5-triazine, 6-(4'-hydroxy-3',5'-di-i-propylanilino)-2-cyclohexyl-4-cyclohexylthio-1,3,5-triazine and 6-(4'-hydroxy-3',5'-di-t-butylanilino)-2,4-di(heptylthio)-1,3,5-triazine. The preferred aniline-substituted triazines are those in which $R_{14}$ is a secondary or tertiary alkyl group, particularly t-butyl, $R_{13}$ is hydroxyl and $R_{12}$ is hydrogen. Preferred $R_{10}$ and $R_{11}$ groups are n-alkylthio of from 6 to 10 carbon atoms inclusive. The most preferred aniline-substituted triazine stabilizer is 6-(4'-hydroxy-3',5'-di-t-butylanilino)-2,4-di-n-octylthio-1,3,5-triazine.

The stabilizer is employed in a quantity sufficient to effectively stabilize the polyketone polymer against degradation caused by exposure to ultra violet light. Such quantities are from about 0.03% to about 5% by weight of the stabilizer based on total stabilized composition, preferably from about 0.1% to about 2% by weight of the stabilizer on the same basis.

The stabilizer is added to the polyketone polymer by conventional methods suitable for producing an intimate mixture of the polymer and the UV stabilizer. Such methods include dry pending of the stabilizer and the polymer in a finely divided form followed by hot pressing, co-extrusion of the polymer and stabilizer, to thereby produce a stabilized composition as an extrudate, or by intimate mixing in a mixer or a blender employing high shear. The stabilized compositions may also contain other additives such as colorants, plasticizers, fibers, reinforcements, dyes and carbon black which are added to the polymer together with or separately from the ultra violet stabilizer.

The stabilized polyketone compositions are useful in the manufacture of fibers, sheets, films, laminates, containers, wire and cable and shaped parts produced by such conventional techniques as melt-spinning, extrusion, injection molding and thermoforming. The compositions are particularly useful in applications where the finished product is likely to be exposed directly to ultra violet light such as structural parts used in construction and parts produced for external automotive applications.

The invention is further illustrated by the following Illustrative Embodiments and Comparative Examples (not of the invention) which should not be construed as limiting.

ILLUSTRATIVE EMBODIMENT

Test specimens were prepared by compression molding a 1 mm thick specimen containing a light stabilizer of the invention. The polymer employed was a linear alternating terpolymer of carbon monoxide, ethylene and propylene having a melting point of 218° C. and an intrinsic viscosity of 1.6 dl/g (measured in m-cresol). The stabilizers were present in a concentration of 1% by weight. Prior to testing, the specimens were allowed to reach equilibrium at 23° C. and 50% relative humidity ovr a 72 hour period.

The specimens were subjected to weatherometer exposure at the following conditions: Xenon arc, water cooled borosilicate glass sampler, intensity 0.6 W.m$^{-2}$ at 340×10$^{-9}$ m, black panel temperature of 55°–60° C., air temperature 30° C., humidity in wet cycle 50% relative, dry cycle 102 minutes wet cycle 18 minutes. Tensile strength was determined by employing a rate of elongation of 20 mm/min. Specimens containing 2-hydroxy-4-n-octyloxybenzophenone (Sample A), 2-(2'-hydroxy-3'-t-butyl-5'-methylphenyl)-5-chlorobenzotriazole (Sample B), 4,4'-bis($\alpha,\alpha$-dimethylbenzyl)diphenylamine (Sample C) and 6-(4'-hydroxy-3',5'-di-t-butylanilino)-2,4-bis(n-octylthio)-1,3,5-triazine (Sample D) were prepared and tested by the above procedures. The results of the testing are shown in Tables IA–C. Also tested was a blank which was unstabilized.

COMPARATIVE EXAMPLE

By the procedure of the Illustrative Embodiment specimens containing samples of two well known and commercially available stabilizers were prepared and tested. The specimens contained poly[(2,2,6,6-tetramethyl-1,4-piperidinediyl)oxy(1,4-dioxo-1,4-butanediyl)oxy-1,2-ethanediyl] (Sample E) and bis(2,2,6,6-tetramethyl-4-piperidinyl) sebacate (Sample F). The results of testing these samples are show in Table IA–C.

TABLE I A

| | Maximum Tensile Strength After (Days), MPA | | |
|---|---|---|---|
| SAMPLE | 0 | 1 | 3 |
| Blank | 78 | 50 | 19 |
| A | 76 | 53 | 50 |
| B | 82 | 55 | 52 |
| C | 83 | 55 | 49 |
| D | 80 | 48 | 47 |
| E | 81 | 49 | 18 |
| F | 71 | 47 | 19 |

TABLE I B

| | Elongation At Break After (Days), % | | |
|---|---|---|---|
| Sample | 0 | 1 | 3 |
| Blank | 470 | 24 | 2 |
| A | 452 | 304 | 253 |
| B | 462 | 296 | 228 |
| C | 459 | 303 | 98 |
| D | 476 | 238 | 55 |
| E | 482 | 35 | 3 |
| F | 385 | 21 | 4 |

TABLE I C

| | E-Modulus After (Days), GPA | | |
|---|---|---|---|
| Sample | 0 | 1 | 3 |
| Blank | 1.02 | 1.12 | 1.25 |
| A | 0.98 | 0.92 | 1.01 |
| B | 1.00 | 0.99 | 0.98 |
| C | 0.95 | 1.03 | 1.04 |
| D | 0.96 | 0.98 | 1.07 |
| E | 1.14 | 1.10 | 1.23 |
| F | 1.04 | 1.01 | 1.14 |

What is claimed is:

1. A composition stabilized against degradation by exposure to ultra violet light comprising
    (a) a linear alternating polymer of carbon monoxide and at least one ethylenically unsaturated hydrocarbon, wherein the polymer is represented by the formula

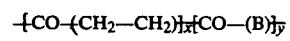

wherein B is the moiety of propylene polymerized through the ethylenic unsaturation and the ratio of y:x is from about 0.01 to about 0.1, and intimately mixed therewith a stabilizing quantity of
    (b) an aniline-substituted triazine of the formula

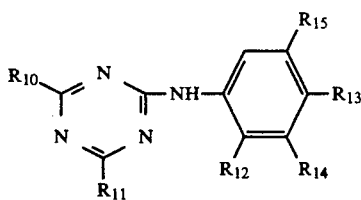

wherein $R_{10}$ and $R_{11}$ independently are alkyl of up to 14 carbon atoms inclusive or alkylthio of up to 14 carbon atoms inclusive, $R_{12}$ and $R_{13}$ independently are hydrogen or hydroxyl with the proviso that at least one of $R_{12}$ and $R_{13}$ is hydroxyl, $R_{14}$ and $R_{15}$ independently are hydrogen or alkyl of up to 6 carbon atoms with the proviso that at least $R_{14}$ is alkyl if $R_{12}$ is hydroxyl and at least one of $R_{14}$ and $R_{15}$ are alkyl if $R_{13}$ is hydroxyl.

2. The composition of claim 1 wherein the aniline-substituted triazine is 6-(4'-hydroxy-3',5'-di-t-butylanilino)-2,4-di-n-octylthio-1,3,5-triazine.

3. The method of stabilizing against degradation by exposure to ultra violet light a linear alternating polymer of carbon monoxide and at least one ethylenically unsaturated hydrocarbon, wherein the polymer is represented by the formula

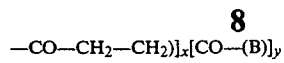

wherein B is the moiety of propylene polymerized through the ethylenic unsaturation and the ratio of y:x is from about 0.01 to about 0.1, by intimately mixing therewith a stabilizing quantity of the stabilizer selected from the aniline-substituted triazines of the formula

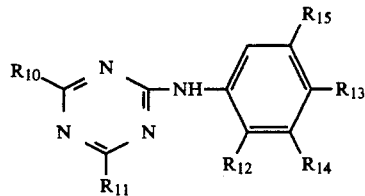

wherein $R_{10}$ and $R_{11}$ independently are alkyl of up to 14 carbon atoms inclusive or alkylthio of up to 14 carbon atoms inclusive, $R_{12}$ and $R_{13}$ independently are hydrogen or hydroxyl with the proviso that at least one of $R_{12}$ and $R_{13}$ is hydroxyl, $R_{14}$ and $R_{15}$ independently are hydrogen or alkyl of up to 6 carbon atoms with the proviso that at least $R_{14}$ is alkyl if $R_{12}$ is hydroxyl and at least one of $R_{14}$ and $R_{15}$ are alkyl if $R_{13}$ is hydroxyl.

4. The method of claim 3 wherein the aniline-substituted triazine is 6-(4'-hydroxy-3',5'-di-t-butylaniline)-2,4-di-n-octylthio-1,3,5-triazine.

* * * * *